Oct. 18, 1949.　　　　　J. A. LINKS　　　　　2,484,895
EDUCATIONAL TOY BOOK

Filed April 5, 1946　　　　　　　　　　　　　3 Sheets-Sheet 1

INVENTOR.
JULIAN A. LINKS
BY
Boyken, Mohler & Beckley
ATTORNEYS.

Oct. 18, 1949.  J. A. LINKS  2,484,895
EDUCATIONAL TOY BOOK
Filed April 5, 1946  3 Sheets-Sheet 2
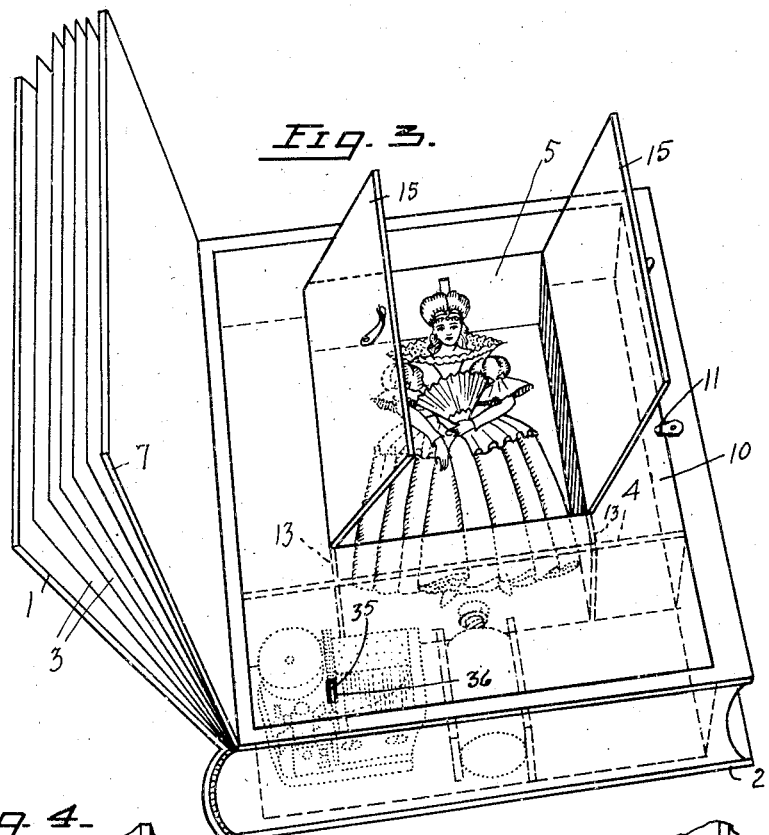
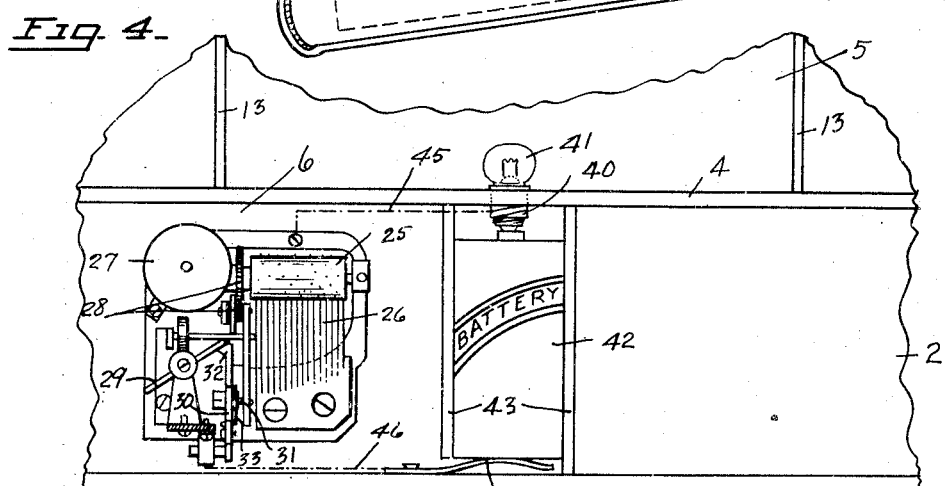
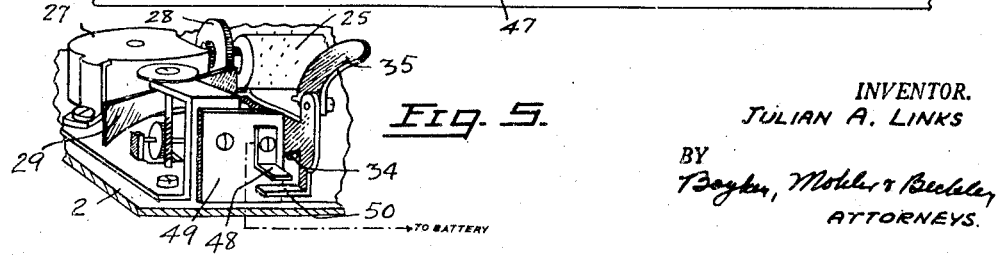
INVENTOR.
JULIAN A. LINKS
BY
ATTORNEYS.

Oct. 18, 1949.　　　　J. A. LINKS　　　　2,484,895
EDUCATIONAL TOY BOOK
Filed April 5, 1946　　　　　　　　　　　　3 Sheets-Sheet 3
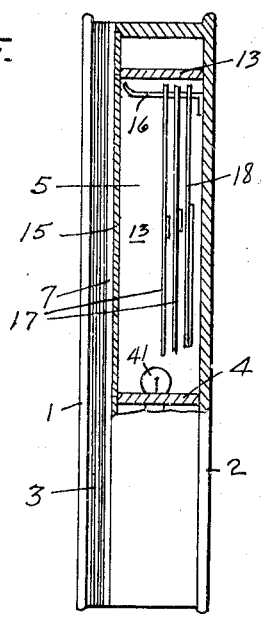
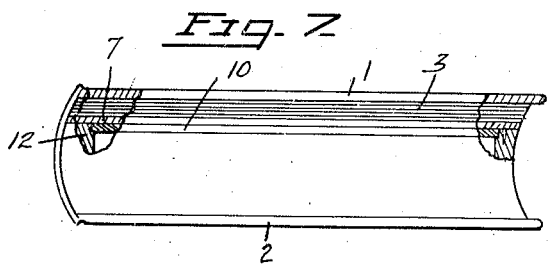
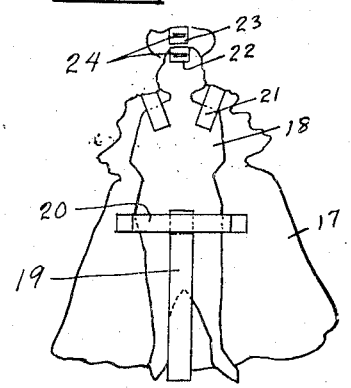
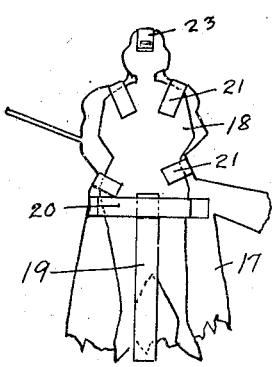
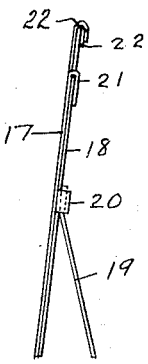
INVENTOR.
JULIAN A. LINKS.
BY
Boyken, Mohler & Beckley
ATTORNEYS.

Patented Oct. 18, 1949

2,484,895

UNITED STATES PATENT OFFICE 2,484,895

EDUCATIONAL TOY BOOK

Julian A. Links, San Francisco, Calif.

Application April 5, 1946, Serial No. 659,989

7 Claims. (Cl. 84—95)

This invention relates to a toy story book for children, and has for one of its objects the provision of a book that combines pictures of the principal characters of such theme or story with a physical representation of the principal character of the story of said book including removable costumes for said character, and which book further includes a music reproducing device adapted to reproduce a musical composition that is related to the said story or theme of the story.

Another object of the invention is the provision of a story book that contains therein the story in the form of illustrations, and also a physical representation of the principal character of said story, including different replaceable costumes corresponding with those shown in the illustrations and which book further includes a music reproducing device adapted to automatically render a musical composition related to said story upon opening the book and reviewing the said illustrations.

Heretofore it has been common practice to read story books to children, and to show or explain the pictures to them in instances where such pictures are printed. The pictures, however, make the most vivid impression on children, and once the story is told, they will repeatedly reconstruct the same from the pictures, and any number of variations are devised from the pictures. However, in the use of pictures alone, the children are inclined to be somewhat indifferent to costume and careless in their interpretations. Also there is nothing in the pictures or text that impresses the auditory nerves, unless some particular sounds happen to occur during the child's preoccupation with the pictures or story. Almost every person has experienced this association between sound and vision. A particular piece of music, classic or otherwise, and of almost any kind, will many times become indelibly impressed upon the memory in association with certain images if such music is heard at the time when the imagination was being actively impressed with such images, whether such images were actual or imaginary.

In view of the above, one of the objects of this invention is the provision of means that will tend to insure congruity in the child's mind between the images or representation of characters in a story and music, so that such incongruous occurrences as the unconscious creation in the mind of visions of an Indian battle will not be called up by hearing the strains of the well known musical piece called "Cinderella." Instead, with this invention the musical composition "Cinderella" will become indelibly impressed upon the memory in association with the mental images of Cinderella in one or more of her various costumes.

It might be stated at this point that the seeing of certain pictures relatively seldom recalls music as compared with the reverse.

In the drawings, Fig. 1 is a perspective view of a closed toy book that is illustrative of the invention.

Fig. 3 is a perspective view of the book of Fig. 1 opened to the compartment that carries the wardrobe and doll and which compartment is divided to enclose the music reproducing device and an electrical source of power, the said device and source of power being indicated in dotted lines.

Fig. 4 is an enlarged fragmentary view showing the compartment carrying the music reproducing device and battery in elevation.

Fig. 5 is a perspective view showing the switch for the light bulb and its association with the music reproducing device.

Fig. 6 is a part elevational, part sectional view through the book, showing one form of doll that may be used and costumes therefor in the wardrobe compartment.

Fig. 7 is a part sectional, part elevational view showing a preferred method for supporting two of the opposite edges of the closure for the compartment in position.

Fig. 8 is a rear elevational view of a doll with one costume thereon.

Fig. 9 is a rear elevational view of a doll with another costume thereon.

Fig. 10 is an edge view of the doll of Fig. 9.

Figure 1:
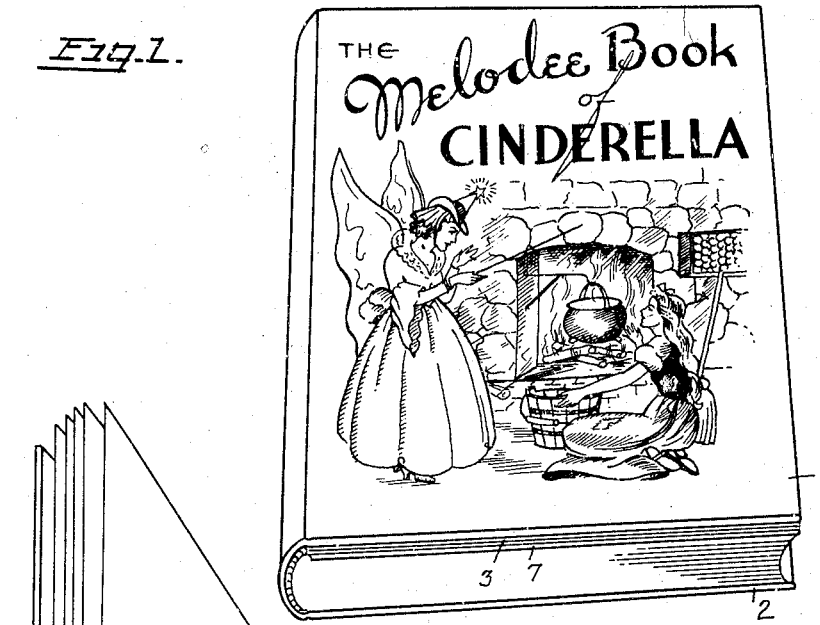

In detail, the book illustrated in the drawings is intended to represent episodes in the life of the fictional character "Cinderella." This is purely illustrative, inasmuch as another book might relate to "Alice," the principal character in Alice in Wonderland, or Through the Looking Glass, etc.

The book comprises a front cover 1, a back cover 2, and a plurality of pages 3 that are successively positioned adjacent the front of the book and are hinged for swinging in the usual manner for conventional books.

The back cover 2 forms the bottom of a main compartment that may be divided by a partition, such as 4 (Figs. 3, 4, 6) into a wardrobe compartment 5 and a music compartment 6.

The front cover of the book may carry the title, such as "The Melodee Book of Cinderella" imprinted thereon (Fig. 1) and also one of the illustrations of Cinderella in one of the episodes of her life may be on said cover and different illustrations, representing other different episodes in the life of Cinderella are preferably on pages 3, such episodes being preferably in chronological order, and each showing Cinderella in a costume appropriate for the particular episode.

Figure 2:
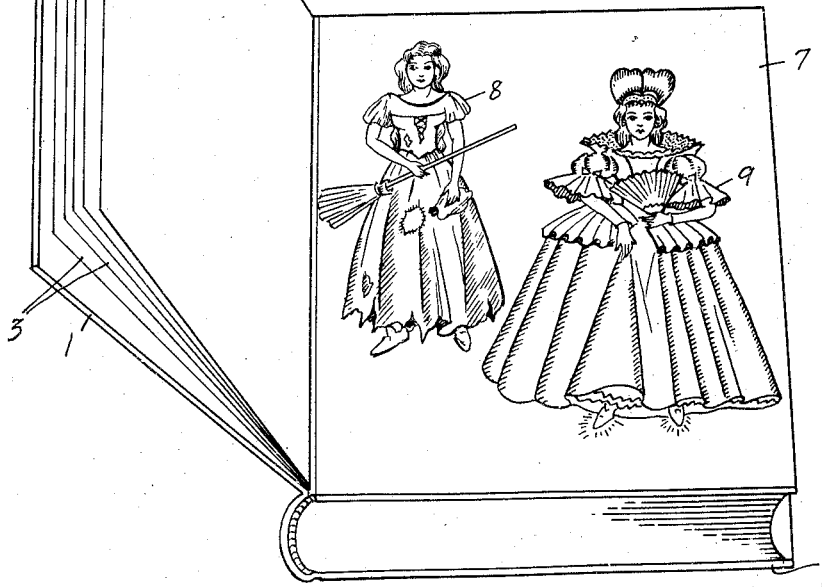
Fig. 2 is a perspective view of the book of Fig. 1 partially open.

One of such pages indicated at 7 in Figs. 3, 5, is preferably rigid and bears thereon representations of Cinderella in several of her different costumes such as were shown on pages 3. These representations are best seen in Fig. 2 at 8 and 9. The representation or picture 8 is illustrative of the fireside costume of rags and tatters, including the broom, while the picture 9 represents the court costume.

This page 7 is the one immediately preceding the wardrobe and music compartments.

A main closure 10 preferably extends completely over both of the compartments, said closure being releasably held in position by a rotary latch 11 along one edge, while the opposite edge is bevelled, as indicated in Fig. 7 to extend under a complementarily rabbeted corner of the back 12 of the book.

Said closure 10 is formed with an opening disposed over said wardrobe compartment 5, and the side walls of said compartment other than partition 4, extend between the closure at the edges of said opening and the back cover 2, said side walls being indicated at 13 (Figs. 3, 4, 6).

A pair of swinging doors 15 meeting centrally of of wardrobe compartment (Fig. 3) are hingedly secured to two opposite edges of said opening for swinging from coplanar closed position to open position substantially as indicated in Fig. 3, it being understood that said doors will remain open by gravity when swung fully open and the book is generally horizontal. Thus doors 15 form a closure for the wardrobe compartment that is carried by the closure for the music compartment, and said doors swing from closed to open position or vice versa, independently of movement of the portion of the main closure 10 covering the music compartment.

In the wardrobe compartment is a bracket 16 (Fig. 6) in the form of an arm projecting forwardly from the bottom of the compartment. Said bracket is secured to said bottom, and constitutes a support for the different costumes 17 that are to clothe the doll 18.

In the form shown said doll and costumes are in sheet form with their contours following the contours of the costumes, and each costume or dress 17 is preferably formed with the face, arms, and feet or legs of the character represented thereby, as seen in Fig. 3. The doll generally follows the contour of the body and is provided with an easel support 19 (Figs. 2, 10) for supporting the doll and dress upright when the dress is on the doll.

The dresses or costumes 17 each preferably carries a strap 20 (Figs. 8, 9, 10) through which the body of the doll is adapted to extend, and which strap is at about the position of the upper end of the prop or easel support 19. Bendable tabs 21 on the dresses and head portions are adapted to be bent over the certain body portions of the doll for helping to secure the dresses on the doll. The material of the dresses and doll is such as to enable bending of the tabs repeatedly without objectionable injury thereto, such material as iron tag board, cloth covered paper and cardboard being suitable for this purpose. The head portion of the doll is provided with a tab 22 that corresponds with a similar tab 23 on the costume, and each of the tabs 22, 23 forms a hanger for hanging the doll and costume from the bracket 16, said tabs being each formed with a slot 24 for passing onto the bracket.

The reason for providing the dresses with head and arms, etc., is that different costumes have different head dresses, such as seen in the court costume (Fig. 3) and also in certain costumes the doll carries a broom or some other article. Full bodied dolls and dresses may obviously be provided, the main thing being that different dresses are provided and the compartment 5 is adapted to hold them and the doll.

In the music compartment is a conventional music reproducing device or musical instrument (Fig. 4) of the type having toothed barrel 25, the teeth of which are arranged to engage the different toned tongues 26 in a manner to audibly reproduce a musical composition upon rotation of the barrel. A clock spring in a housing 27 is adapted to be wound in the same manner as the spring of a clock and is connected by conventional gearing 28 with the barrel for rotating the latter. A conventional rotary governor 29 in the form of radially extending blades operating against the resistance of the air, controls the speed at which the barrel is rotated. All this structure is old in musical instruments of this kind, and no claim is made to the same in itself.

The musical instrument above described is one, in the present instance, that reproduces the musical composition "Cinderella."

Controlling the starting and stopping of the musical instrument is a lever 30 that is pivoted on a pin 31 (Fig. 4). One end 32 of said lever will swing upward in a direction away from the bottom 2 when the opposite end is depressed, and when said end 32 is elevated it will block rotation of the governor 29, thus stopping the rotation of barrel 25 and the music will cease. Upon dropping of end 32, the governor will be released and the music will recommence.

A common light torsion spring 33 around pin 31 engages the lever 30 at one end 34 (Fig. 5) for urging end 32 downwardly and the opposite end upwardly.

Said opposite end of lever 30 is provided with an upstanding arm 35 that is adapted to extend through a slot 36 in closure 10 (Fig. 3) for engagement by the relatively heavy page 7 of the book. The weight of the cover 1 alone would be adequate to hold the arm 35 depressed for stopping the musical device in the absence of page 7. As soon as page 7 is raised the torsion spring 33 will immediately move the end 32 of the lever out of engagement with the governor, and the musical instrument or device will start.

In the partition 4 is a socket 40 for the base of a common flashlight bulb 41 with said bulb directed into the wardrobe compartment. The bases of the bulb and socket are adapted to communicate with the interior of the musical compartment 2, and a battery 42 is releasably held in said latter compartment between partitions 43 with its carbon terminal in contact with the base 44 of the bulb (Fig. 4).

One electrical conductor 45 extends from the socket 40 to the metal base of the musical device, while a second conductor 46 extends from a spring contact 47 that is in engagement with the bottom of the battery, to one contact 48 of a switch element (Fig. 5), said element being supported on an electrical insulation sheet 49 carried by said musical instrument.

The lever 30 carries a switch contact member 50 depending therefrom at the end adjacent the arm 35, which member is below the contact 48. When the end of the lever carrying the arm 35 is depressed by the leaf 7, the contacts 48, 50 are separated and the electrical circuit is broken, but when the book is opened and leaf 7 is elevated, the contacts 48, 50 are brought into contact simultaneously with the release of the lever end 32 from engagement with the governor, whereby illumination of the wardrobe compartment and the starting of the music are simultaneous.

With the above invention as described, it will be seen that the interest of the child in the story as pictured by the illustrations will be taken up in the said illustrations at the point where the last page 7 is raised and at this point, the music related to the story, play or episodes, will commence and the compartment carrying the clothes and doll or dolls that correspond with the illustrations that have just been depicted on the preceding pages will be illuminated and accessible for handling by the child. Thus it will be seen that means is provided whereby the child is not only amused and surprised but the co-relationship between the music and the appropriate characters is indelibly impressed upon the mind of the child.

It is to be understood that the detailed description and illustrations are not to be considered restrictive of the invention, but merely illustrative thereof.

I claim:

1. A child's toy comprising a story book having front and rear covers, a compartment disposed between said covers and carried by said rear cover rigid therewith, a plurality of leaves disposed between said front cover and said compartment bearing images imprinted thereon representing the leading character of said story in different costumes, said compartment including a doll representing said character and costumes for said doll corresponding with said different costumes, and said compartment further including a music reproducing device adapted to musically reproduce a composition, the theme of which corresponds with the theme of said story, means actuated by movement of said front cover and leaves to open position for starting said device.

2. A child's toy comprising a story book having front and rear covers, a compartment disposed between said covers and carried by said rear cover rigid therewith, a plurality of leaves disposed between said front cover and said compartment bearing images imprinted thereon representing the leading character of said story in different costumes, said compartment including a doll representing said character and costumes for said doll corresponding with said different costumes, and said compartment further including a music reproducing device adapted to musically reproduce a composition, the theme of which corresponds with the theme of said story, means actuated by movement of said front cover and leaves to open position for starting said device, an electric light bulb in an electrical circuit supported in said compartment for illuminating said doll and said costumes therefor, and said last mentioned means including a switch for closing the said circuit upon said means being actuated for starting said device.

3. A child's toy comprising a story book having front and rear covers, a compartment disposed between said covers and carried by said rear cover rigid therewith, a plurality of leaves disposed between said front cover and said compartment bearing images imprinted thereon representing the leading character of said story in different costumes, said compartment including a doll representing said character and costumes for said doll corresponding with said different costumes, and said compartment further including a music reproducing device adapted to musically reproduce a composition, the theme of which corresponds with the theme of said story, means actuated by movement of said front cover and leaves to open position for starting said device, means in said compartment for suspending said costume in said compartment including hangers for said costumes.

4. A child's toy comprising a story book having front and rear covers, a main compartment disposed between said covers and carried by said rear cover rigid therewith, a partition in said compartment separating it into a wardrobe compartment and a music compartment, a music reproducing device in said music compartment, a closure over said music compartment and a separate closure over said wardrobe compartment, said latter closure being carried by the closure for said music compartment and adapted to be opened independently of the closure for said music compartment when the latter closure is closed, said cover bearing thereon the image of the principal character of the story of said book, the music to be reproduced by said device being co-related to the theme of said story, and said wardrobe compartment having therein a doll representing said theme including costumes for said doll.

5. A child's toy comprising a story book having front and rear covers, a main compartment disposed between said covers and carried by said rear cover rigid therewith, a partition in said compartment separating it into a wardrobe compartment and a music compartment, a music reproducing device in said music compartment, a closure over said music compartment and a separate closure over said wardrobe compartment, said latter closure being carried by the closure for said music compartment and adapted to be opened independently of the closure for said music compartment when the latter closure is closed, said cover bearing thereon the image of the principal character of the story of said book, the music to be reproduced by said device being co-related to the theme of said story, and said wardrobe compartment having therein a doll representing said theme including costumes for said doll, a movable starter on said device actuated for movement by opening said book for starting said device and means for holding said starter stationary comprising a leaf in said book between said front cover and said main compartment.

6. A child's toy comprising a story book having front and rear covers, a main compartment disposed between said covers and carried by said rear cover rigid therewith, a partition in said compartment separating it into a wardrobe compartment and a music compartment, a music reproducing device in said music compartment, a closure over said music compartment and a separate closure over said wardrobe compartment, said latter closure being carried by the closure for said music compartment and adapted to be opened independently of the closure for said music compartment when the latter closure is closed, said cover bearing thereon the image of the principal character of the story of said book, the music to be reproduced by said device being co-related to the theme of said story, and said wardrobe compartment having therein a doll representing said theme including costumes for said doll, means for stopping and for starting said music device.

7. A child's toy comprising a story book having front and rear covers, a main compartment disposed between said covers and carried by said rear cover rigid therewith, a partition in said compartment separating it into a wardrobe compartment and a music compartment, a music reproducing device in said music compartment, a closure over said music compartment and a separate closure over said wardrobe compartment, said latter closure being carried by the closure for said music compartment and adapted to be opened independently of the closure for said music compartment when the latter closure is closed, said cover bearing thereon the image of the principal character of the story of said book, the music to be reproduced by said device being co-related to the theme of said story, and said wardrobe compartment having therein a doll representing said theme including costumes for said doll, an electric light bulb in said wardrobe compartment and in an electrical circuit for illuminating the interior of said compartment, and movable means including an element common to said music device and said circuit for starting said device and for closing said circuit substantially simultaneously whereby said music will commence and said wardrobe will be illuminated at substantially the same time.

JULIAN A. LINKS.

REFERENCES CITED

The following references are of record in the file of this patent:

UNITED STATES PATENTS

| Number | Name | Date |
| --- | --- | --- |
| 1,490,295 | Stephens | Apr. 15, 1924 |
| 1,629,635 | Parsons | May 24, 1927 |
| 1,655,510 | Runyan | Jan. 10, 1928 |
| 2,305,993 | Ramsey | Dec. 22, 1942 |
| 2,442,447 | Zadig | June 1, 1948 |

FOREIGN PATENTS

| Number | Country | Date |
| --- | --- | --- |
| 515,852 | Great Britain | Dec. 15, 1939 |